(12) United States Patent
Razavi et al.

(10) Patent No.: US 12,088,410 B2
(45) Date of Patent: Sep. 10, 2024

(54) METHODS AND SYSTEMS FOR EXCHANGING PERIODIC DATA IN A MOBILE TELECOMMUNICATIONS NETWORK

(71) Applicant: VODAFONE IP LICENSING LIMITED, Newbury (GB)

(72) Inventors: Razieh Razavi, London (GB); Alice Li, London (GB)

(73) Assignee: Vodafone IP Licensing Limited, Berkshire (GB)

( * ) Notice: Subject to any disclaimer, the term of this patent is extended or adjusted under 35 U.S.C. 154(b) by 60 days.

(21) Appl. No.: 17/773,842

(22) PCT Filed: Nov. 9, 2020

(86) PCT No.: PCT/EP2020/081497
§ 371 (c)(1),
(2) Date: May 2, 2022

(87) PCT Pub. No.: WO2021/089871
PCT Pub. Date: May 14, 2021

(65) Prior Publication Data
US 2022/0376817 A1    Nov. 24, 2022

(30) Foreign Application Priority Data

Nov. 8, 2019    (GB) ..................... 1916290

(51) Int. Cl.
*H04L 1/00* (2006.01)
*H04L 1/08* (2006.01)
(Continued)

(52) U.S. Cl.
CPC .......... *H04L 1/0009* (2013.01); *H04L 1/0003* (2013.01); *H04L 1/08* (2013.01);
(Continued)

(58) Field of Classification Search
CPC ....... H04L 1/0009; H04L 1/0003; H04L 1/08; H04L 1/1809; H04L 1/1812; H04L 1/188;
(Continued)

(56) References Cited

U.S. PATENT DOCUMENTS

2005/0135242 A1    6/2005  Larsen et al.
2007/0086422 A1*   4/2007  Kim ..................... H04L 1/1812
                                                    370/349
(Continued)

FOREIGN PATENT DOCUMENTS

CN    1716912 A     1/2006
CN    101039313 A   9/2007
(Continued)

OTHER PUBLICATIONS

"3rd Generation Partnership Project; Technical Specification Group Services and System Aspects; Feasibility Study on New Services and Markets Technology Enablers—Critical Communications; Stage 1 (Release 14)", 3GPP Standard; 3GPP TR 22.862, 3rd Generation Partnership Project (3GPP), Mobile Competence Centre ; 650, Route Des Lucioles ; F-06921 Sophia-Antipolis Cedex ; France, vol. SA WG1, No. V2.0.0, Jun. 23, 2016 (Jun. 23, 2016), pp. 1-31, XP051123660.
(Continued)

*Primary Examiner* — James C Kerveros
(74) *Attorney, Agent, or Firm* — Workman Nydegger (57) ABSTRACT

The present invention provides a method and system of periodic transmission of data between a first entity and a second entity within a mobile communication network. In order to increase transmission quality and take into account application characteristics of the network entities the first entity is able to obtain an adverse response from the second entity and provide an ancillary message to the second entity, where the ancillary message may have different contents
(Continued)

depending on transmission circumstances, with the aim to increase the quality of transmission and to ensure the application requirements are met in different situations.

15 Claims, 7 Drawing Sheets

(51) Int. Cl.
    *H04L 1/1809*      (2023.01)
    *H04L 1/1812*      (2023.01)
    *H04L 1/1867*      (2023.01)
    *H04L 12/28*      (2006.01)
    *H04W 28/04*      (2009.01)

(52) U.S. Cl.
    CPC .......... *H04L 1/1809* (2013.01); *H04L 1/1812* (2013.01); *H04L 1/188* (2013.01); *H04L 12/2834* (2013.01); *H04W 28/04* (2013.01)

(58) Field of Classification Search
    CPC .... H04L 12/2834; H04L 67/12; H04W 28/04; H04W 84/18
    USPC ........................................................ 714/726
    See application file for complete search history.

(56) References Cited

U.S. PATENT DOCUMENTS

| | | | |
|---|---|---|---|
| 2008/0298235 A1 | 12/2008 | Neugebauer | |
| 2011/0243048 A1* | 10/2011 | Wang | H04L 1/1874 370/329 |
| 2014/0126553 A1 | 5/2014 | Li et al. | |
| 2015/0092645 A1* | 4/2015 | Tabet | H04L 1/1812 370/311 |
| 2017/0265182 A1 | 9/2017 | Guo et al. | |
| 2017/0311227 A1* | 10/2017 | Kim | H04W 40/10 |
| 2018/0234213 A1* | 8/2018 | Han | H04L 1/1854 |
| 2018/0302191 A1* | 10/2018 | Park | H04W 72/23 |
| 2019/0052419 A1* | 2/2019 | Yang | H04W 72/12 |
| 2020/0259594 A1* | 8/2020 | Takeda | H04L 1/1858 |
| 2021/0377793 A1* | 12/2021 | Moilanen | H04L 1/08 |
| 2022/0166595 A1* | 5/2022 | Laselva | H04L 5/0044 |

FOREIGN PATENT DOCUMENTS

| | | |
|---|---|---|
| CN | 106455043 A | 2/2017 |
| CN | 107888342 A | 4/2018 |
| EP | 1889395 | 2/2008 |
| WO | 2013133211 A1 | 9/2013 |
| WO | 2019030871 A1 | 2/2019 |

OTHER PUBLICATIONS

"3 Generation Partnership Project; Technical Specification Group Services and System Aspects; Feasibility Study on New Services and Markets Technology Enablers; Stage 1 (Release 14)", 3GPP Standard; Technical Report; 3GPP TR 22.891, 3rd Generation Partnership Project (3GPP), Mobile Competence Centre ; 650, Route Des Lucioles ; F-06921 Sophia-Antipolis Cedex ; France, vol. SA WG1, No. V2.0.0, Mar. 9, 2016 (Mar. 9, 2016), pp. 1-95, XP051450142, p. 53, section "5.45 Industrial Factory Automation" p. 56, section "5.46 Industrial Process Automation".

International Search Report and Written Opinion for PCT/EP2020/081497 mailed Dec. 1, 2020.

Frotzscher Andreas et al: "Requirements and current solutions of wireless communication in industrial automation", 2014 IEEE International Conference on Communications Workshops (ICC), IEEE, Jun. 10, 2014 (Jun. 10, 2014), pp. 67-72, XP032630777, DOI: 10.1109/ICCW.2014.6881174.

2006 First International Symposium on Pervasive Computing and Applications, Jan. 29, 2007, Fernando, 'Automated Discovery of Human Activities inside Pervasive Living Spaces', (6 pages).

Han, 'Research on Design of Fault Diagnosis System for Countermeasure Equipment', 2008 Radio Engineering Vol•38 No. 11 (3 pages).

* cited by examiner

PRIOR ART

METHODS AND SYSTEMS FOR EXCHANGING PERIODIC DATA IN A MOBILE TELECOMMUNICATIONS NETWORK

CROSS-REFERENCE TO RELATED APPLICATIONS

The present application is a 371 US Nationalization of International Patent Application No. PCT/EP2020/081497, filed Nov. 9, 2020, which claims priority to UK Patent Application No. 1916290.8, filed Nov. 8, 2019. The entire disclosures of the aforementioned applications are incorporated herein by reference.

FIELD OF THE INVENTION

The present disclosure relates to methods, systems, and apparatus for use in exchanging data in a mobile telecommunications network. In particular, the present disclosure relates to the periodic exchange of data between two entities within mobile telecommunication system. The disclosure relates to methods, systems, and apparatus for the periodic exchange of data, where the periodic exchange of data includes exchanging data in accordance with a known transmission schedule or sending data at pre-determined or known times as well as exchanging event driven data.

BACKGROUND

Periodic communication/transmissions, and the period exchange of data, is very commonly used in communication services or systems used for factory automation and the automation of assembly lines. Periodicity, periodic communications/transmissions, and the periodic exchange of data generally comprises a set of communications for which a transmission interval is repeated, where the transmission interval may be understood to be a fixed or scheduled time between the transmissions of data or messages to or from an entity. Periodic communication/transmissions in factory automation or the automation of assembly lines can, for example, be used to provide a periodic update of a position or a machine or robot within the factory or assembly line, or may allow for the repeated or continuous monitoring of a characteristic parameter of the factory, a machine, a robot, or a part thereof. Most transmission intervals used in communications for automation are relatively short, for example, periodic transmissions may be send from an entity within the communication system every 0.5 ms or 1 ms, such that the transmission interval is 0.5 ms or 1 ms respectively. Usually, periodic transmissions from an entity within a communication system are started and transmitted continuous unless a stop or halt command is provided to the entity. In factory automation and the automation of assembly lines, the reliable and continuous transmission of messages of a periodic transmission is vital to the proper functioning and operation of the factory or assembly line. Interruptions in the periodic transmissions where, for example, a periodic transmission or multiple periodic transmissions are not received by, or correctly transmitted to, a specific entity the within the factory's communication system, such as a part of a motion control system, can cause the machines or robots being controlled to cease or halt any operations or actions they are carrying out. This may, in turn, cause the factory or assembly line to unexpectedly and/or unwantedly stop production, which may lead to a decrease in factory output, an increase in wasted time, and energy of production and an increase in the overall production costs.

Figure 1:
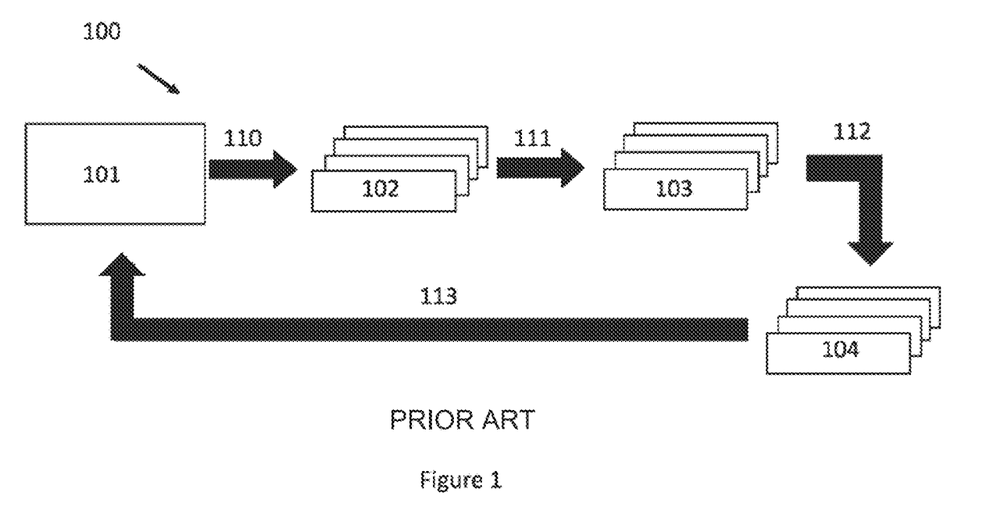
FIG. 1 is a schematic illustration of a typical motion control system.

FIG. 1 depicts a typical motion control system 100 for use in an automated factory or assembly line, where a motion control system is responsible for controlling moving and/or rotating parts of machines in a well-defined manner, for example in printing machines, machine tools or packaging machines. A motion controller 101 periodically transmits a message comprising a plurality of desired set points 110, where a desired set point may be a desired position or rotation of a component of a machine or part thereof being controlled, to one or a plurality of actuators 102, for example a linear actuator or a drive, which thereupon perform a corresponding action 111 on one or several processes 103 being carried out in the automated factory or assembly line. Typically, such actions comprise a movement or rotation of a certain component of a machine being controlled. At the same time, sensors 104 determine or sense 112 the current state of the processes 103, e.g. the current position and/or rotation of one or multiple components, and transmit 113 data representing actual values of the position and/or rotation back to the motion controller. The transmission of the actual values back to the motion controller is an important part of the automation process and may be referred to as feedback. The transmission of data in FIG. 1 is done in a cyclic and deterministic manner, such that during one application cycle, the motion controller sends updated set points to all actuators, and all sensors send their actual values back to the motion controller, i.e. one instance of steps 111, 112, 113 and 114 being carried out. The determination of the desired set points 110, the performing of an action 111, the sensing 112 and the transmission 113, are typically carried out in accordance with an automation program Typically, Industrial Ethernet technologies are currently used for motion control systems. However, it would be desirable to enable motion control systems and factory automation to utilise mobile communication networks because it allows for a more flexible and dynamic deployment of resources. Unfortunately, as discussed below, known configurations of mobile communications systems do not allow for the reliability required by periodic communication systems used for factory automation.

Mobile communication systems especially implemented according to the fourth and fifth generation (i.e. 4G and 5G mobile communication systems) may support many different services. Usually, once a user/mobile device requests the establishment of a mobile communication service to the mobile communication system, the mobile communication system, in particular a core network part of the mobile communication system, establishes a bearer with a base station and requests, during establishment, that the bearer satisfies a particular characteristic to ensure that the quality of the communications provided are sufficient for the desired application/service. These particular characteristics may include packet loss, bit rate, throughput, transmission, delay, availability and jitter. The bearer characteristics are associated with a particular Quality of Service (QoS) Indicator and, after the particular QoS Indicator is provided to the base station, the base station establishes a radio data bearer (DRB) to the user/mobile device. All data transmissions scheduled corresponding to this user/mobile device and corresponding bearer shall satisfy the requirements of the Quality of Service (QoS).

In order to satisfy the requirements of a particular Quality of Service (QoS) the base station might switch on or off different features, once scheduling of resources is needed.

One example of such a functionality is to send duplicate packets and another example is to use an ACK/NACK mode as specified, for example, in 3GPP TS 38.321, Version 15.7.0, 27 Sep. 2019, for Mobile communication Networks of the fifth generation. If the QoS provided requires a high reliability, it is most likely that Base Station will positively or negatively acknowledge the reception of every Protocol Data Unit (PDU) on the lower layers, where once the quality of the link between two nodes is good and there are high requirements on the speed of transmission it might disable ACK/NACK mode. It also has to be understood that any variations of ACK/NACK mode might be configured, so that ACK/NACK might be sent in order to positively or negatively acknowledge the received data on different frequencies.

An operator of mobile communication system provides the mapping of different applications/services to particular quality of services. For example, if the user requests web-browsing service, the characteristics of bearer associated to this service would need to satisfy requirements standardised for QoS Indicator 9, which is non-guaranteed bit rate quality of service. Similarly, if the user requests voice service like VOLTE the bearer, established to deliver this service, will need to satisfy the requirements for guarantied bit rate services (e.g. QoS1).

Requirements associated with different QoSs are standardised by 3GPP. In the case of factory automation, different qualities of service requirements are described, for example, in 3GPP TS 22.104, Version 17.1.0, 27 Sep. 2019, and according to this specification, a bearer associated to a particular quality of service should satisfy the characteristics of table 1.

Communication service availability is one of the key parameters and is a percentage value of the amount of time the end-to-end communication service is delivered according to an agreed QoS, divided by the amount of time the system is expected to deliver the end-to-end service in accordance with a specific area. For example, the value of 99,999% means that only 30 seconds of interruption time within a period of 1 year are acceptable for the service to satisfy this requirement.

Communication service availability is calculated as an average percentage value of the amount of time the end-to-end communication service is delivered. This use of an average percentage value is what makes such known systems unsuitable for use in factory automation or a motion control system 100 as discussed above. If interruptions of communication are rare and distributed over time, it may be sufficient to provide services for, for example, factory automation, by satisfying Quality of Service. For example, if the interruptions do not last more than a single transmission period of the system. However, if longer or multiple interruptions to the periodic transmissions happen in a short period of time it can cause the machines being controlled, and therefore the whole automated factory, to halt, even though the Quality of Service requirements are fulfilled. For example, the QoS discussed above allows for 30 seconds of interruption time. If, in a particular instance, an interruption of 10 seconds to the mobile communication network was experienced then, if the transmission interval was 1 ms, 10,000 messages would not have been transmitted. Such an interruption would almost certainly cause the machines (such as or actuators 101) being controlled to halt, as they would not have been provided with instructions (such as the required set points 110).

The subject matter contained in the present application aims to provide systems and methods to improve the system performance in regards to transmission characteristics such as reliability, delay and/or failure rate especially if particular application characteristics are taken into account.

TABLE 1

| Communication service availability | End-to-end latency: maximum | Message size [byte] | Transfer interval: target value | Survival time | UE speed | # of UEs | Service area |
|---|---|---|---|---|---|---|---|
| 99.999% to 99.99999% | <transfer interval value | 50 | 500 μs | 500 μs | ≤75 km/h | ≤20 | 50 m × 10 m × 10 m |
| 99.9999% to 99.999999% | <transfer interval value | 40 | 1 ms | 1 ms | ≤75 km/h | ≤50 | 50 m × 10 m × 10 m |
| 99.9999% to 99.999999% | <transfer interval value | 20 | 2 ms | 2 ms | ≤75 km/h | ≤100 | 50 m × 10 m × 10 m |
| 99.9999% to 99.999999% | <transfer interval value | 1k | ≤10 ms | 10 ms | — | 5 to 10 | 100 m × 30 m × 10 m |
| >99.9999% | <transfer interval value | 40 to 250 | 1 ms to 50 ms | transfer interval value | ≤50 km/h | ≤100 | ≤1 km$^2$ |
| 99.9999% to 99.999999% | <transfer interval value | 20 | ≥10 ms | 0 | typically stationary | typically 10 to 20 | typically ≤100 m × 100 m × 50 m |
| >99.9999% | <transfer interval value | 15k to 250k | 10 ms to 100 ms | transfer interval value | ≤50 km/h | ≤100 | ≤1 km$^2$ |
| >99.9999% | <transfer interval value | 40 to 250 | 40 ms to 500 ms | transfer interval value | ≤50 km/h | ≤100 | ≤1 km$^2$ |
| 99.99% | <transfer interval value | 20 to 255 | 100 ms to 60 s | ≥3 × transfer interval value | typically stationary | ≤10 000 to 100 000 | ≤10 km × 10 km × 50 m |

SUMMARY OF THE INVENTION

According to the first aspect of the present disclosure there is provided a method of periodic transmission of data between a first entity and a second entity within a mobile communication network, the method comprising obtaining, at the first entity, second entity information comprising a required receiving window time and a second entity survival time; providing, a message of a periodic transmission from the first entity to the second entity; and providing an ancillary message from the first entity to the second entity after an adverse response to the message of a periodic transmission is obtained by the first entity, wherein the content of the ancillary message is determined based on the adverse response, the required receiving window time and the second entity survival time.

According to a second aspect of the invention there is provided a mobile communication network comprising a first entity and a second entity, wherein the first entity is configured to obtain second entity information comprising a required receiving window time and a second entity survival time; provide, a message of a periodic transmission to the second entity; and provide an ancillary message to the second entity when an adverse response to the message of a periodic transmission is obtained by the first entity, wherein the content of the ancillary message is determined based on the adverse response, the required receiving window time and the second entity survival time.

According to a third aspect of the invention there is provided an entity of a mobile communication network configured to obtain information about an another entity, the another entity information comprising a required receiving window time for the another entity and an another entity survival time; provide, a message of a periodic transmission to the another entity; and provide an ancillary message to the another entity when an adverse response to the message of a periodic transmission is obtained by the first entity, wherein the content of the ancillary message is determined based on the adverse response, the required receiving window time and the another entity survival time.

According to a fourth aspect of the invention there is provided a machine-readable medium having instructions stored thereon which, when executed by a processor, cause the processor to carry out a method comprising obtaining, at a first entity, second entity information comprising a required receiving window time and a second entity survival time; providing, a message of a periodic transmission from the first entity to a second entity; and providing an ancillary message from the first entity to the second entity after an adverse response to the message of a periodic transmission is obtained by the first entity, wherein the content of the ancillary message is determined based on the adverse response, the required receiving window time and the second entity survival time.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all examples and/or features of any example can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF FIGURES

One or more embodiments of the invention are shown schematically, by way of example only, in the accompanying drawings, in which.

DETAILED DESCRIPTION

Before particular examples of the present disclosure are described, it is to be understood that the present disclosure is not limited to the particular mobile network systems, modules and devices or methods described herein. It is also to be understood that the terminology herein is used for describing particular examples only and is not intended to limit the scope of the claims appended hereto.

Whilst the present disclosure is generally presented in the context of the 5G New Radio (NR) and/or the LTE protocols, it will be understood that the teachings of the present disclosure may apply equally to other examples of mobile telecommunications protocols. For example, the teachings presented herein may apply to any situation in which data is periodically exchanged between two devices in a telecommunications network using FDD or TDD spectrum. One or more devices, nodes or modules of a telecommunications network may operate in accordance with one or more standardised protocols. Suitable examples of standardised protocols may include (but are not limited to) any 3GPP standardised protocol including the Fourth Generation (4G), the Long-Term Evolution (LTE), the LTE-Advanced, the Fifth Generation (5G) and/or NR. In at least some examples contemplated herein, different nodes, modules and/or devices of a telecommunications network may operate in accordance with different standardised protocols. Furthermore, a network may include one or more devices, modules and/or nodes configured to operate in accordance with a plurality of different standardised protocols.

Figure 2:
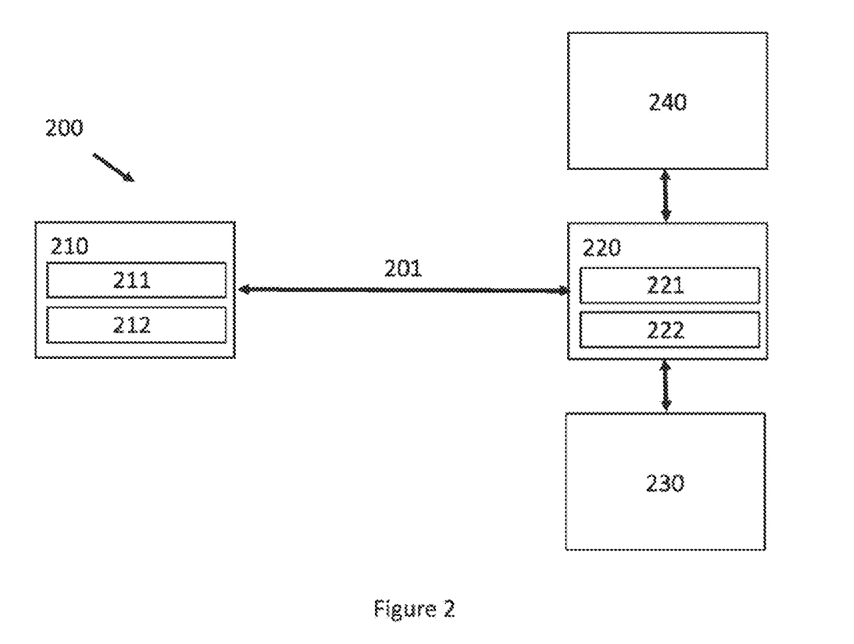
FIG. 2 is a schematic illustration of a mobile telecommunications network.

FIG. 2 shows a typical mobile communication network 200 according to the present invention. In some embodiments, the mobile communication network 200 is a motion control system for factory automation, such as the motion control system 100 of FIG. 1. The mobile communication network 200 comprises a first entity 210 and a second entity 220.

The first entity 210, typically initiates a periodic exchange of data with to the second entity 220. The first entity 210 is preferentially a sensor, actuator or any other user equipment (UE), which itself may be connected to any other periphery devices such as sensors, aggregators, etc. and able to obtain information or data from them. For example, the first entity 210 may be connected to a sensor that provides feedback about the position or rotation of a particular machine and/or robot within an automated factory or assembly line.

Additionally, or alternatively, the first entity 210 may be connected to one, or a plurality of, actuators, for example a linear actuator or a drive, to which the first entity 210 may provide instructions. In embodiments in which the mobile communication network 200 is a motion control system for factory automation according to FIG. 1 the first entity 210 may comprise the one or more of actuators 102 and/or the one or more sensors 104. The second entity 220 is preferentially a base station according to the fourth or fifth generation.

The first entity 210 and the second entity 220 may each comprise a communication layer 211, 221 and an application layer 212, 222. The communication layer 211 of the first entity 210 is configured to communicate with the second entity 220 and the second entity 220 is configured to communicate with the first entity 210. The application layer 212 of the first entity 211 may, for example, be configured to control, communicate, or connect to, the plurality of sensors or actuators.

The second entity 220 is preferentially a base station (BS) which may comprise a motion controller, such as the motion control 101 of FIG. 1.

In other embodiments, the first entity 210 may comprise a base station (BS) and the second entity 220 may comprise a sensor, actuator or any other user equipment (UE).

The second entity 220 and the first entity 210 can communicate via standardised protocols of mobile networks 201. The second entity 220 may also be connected to other components of the mobile communication network 200 such as a core network 230 and/or one or more servers 240. In some embodiments, the second entity 220 may comprise the core network 230 and/or the one or more servers 240, or some elements thereof, on a single unit of hardware, or multiple different units of hardware but at the same geographical location.

In some embodiments, the servers 240 may support different applications, may be based on the same hardware unit as the base station, may be based on different hardware which is inside the mobile communication network 200, or may be based outside of the mobile communication network 200 in which case they are reachable from mobile network by means of other communication such as using an internet connection, an Ethernet connection or any other suitable connection available.

When the first entity 210 and the second entity 220 are periodically exchanging data, the first entity 210 and the second entity 220 both have knowledge of when periodic messages should be received from, and sent to, the opposing entity. Therefore, the first entity 210 will know the time at which it should receive a periodic transmission from the second entity 220 and the second entity 220 will know when it should receive a message of a periodic transmission from the first entity 210.

A message of periodic transmission may generally be understood to be a message of a plurality of messages which are transmitted with periodicity. In particular, when operating under normal conditions, transmissions from the first entity 210 to the second entity 220 have a transmission interval that is repeated, where the transmission interval may be understood to be a fixed or known time between the transmission of messages.

In particular, in some embodiments, the first entity 210 will know when it should receive a set of instructions, or set points, from the second entity, which are used to control one a plurality of machines, actuators or sensors.

Additionally, in some embodiments, the second entity 220 will know when it should receive a message comprising feedback from the first entity 210, where the feedback may comprise the actual position or rotation of a particular machine or actuator, or any other appropriate sensor data.

The pre-determined time period in within which a message of a periodic transmission is expected to be received, and within which it is required to be received, is defined as a receiving window. The receiving window is typically based on the transfer interval of the messages of a periodic transmission, however it may also depend on other factors or be tailored for specific applications or network control systems. The receiving window may also account for latency in the transfer of a message of a periodic transmission, which may also be known as the transmission time.

If a network entity does not receive the expected message of a periodic transmission within the receiving window then the application layer of the network entity will enter a survival time. The behaviour of an application, which is running on the application layer, after the expiration of survival time, may differ depending on the particular application. However, the survival time is generally the time period in which the application can continue to run without failing.

Figure 3:
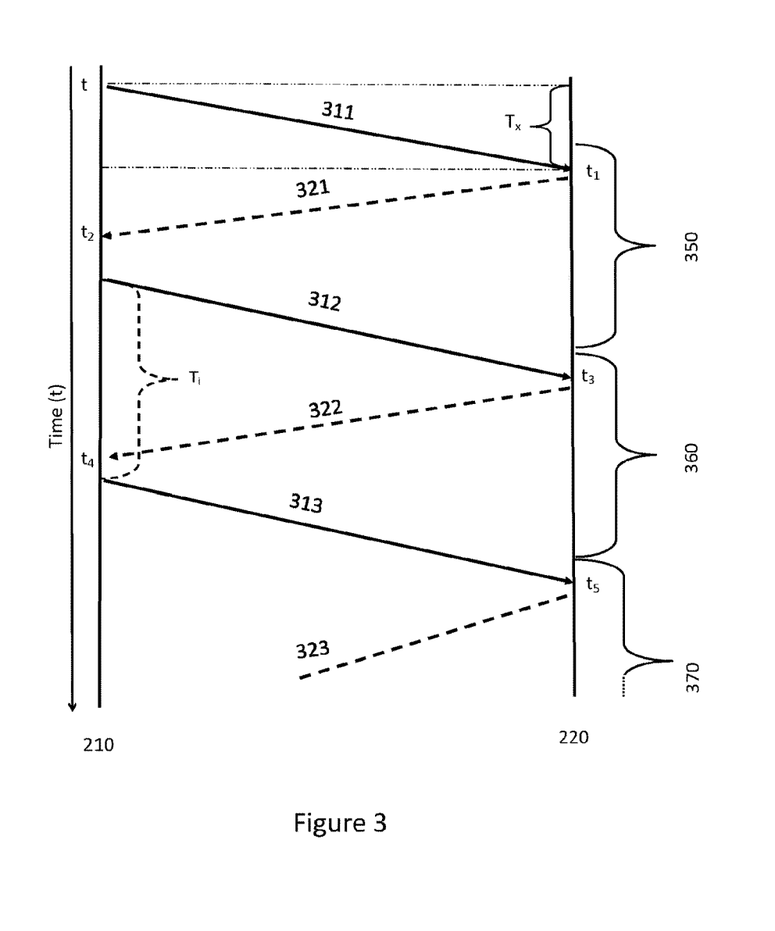
FIG. 3 shows an ideal periodic exchange of data between a first entity and a second entity.

FIG. 3 shows a typical periodic exchange of data between a first entity 210 and a second entity 220. As seen in FIG. 3, the first entity 210 initiates periodic communication with the second entity 220 by sending a first message of a periodic transmission 311, at a time $t_0$. The first message of a period transmission 311 may be understood to be the first message of a plurality of messages sent as periodic transmissions from the first entity 210 to the second entity 220.

Alternatively, although not shown, the second entity 220 may send a first message of a period transmission to the first entity 210 to initiate periodic communication between the first entity 210 and the second entity 220.

After receiving the first message of a period transmission 311 in a first message receiving window 350, at a first time $t_1$, the second entity 220 will process the first message 311 and act in accordance with the information contained within the first message 311. Time $t_1$ is generally the time of sending $t_0$ plus some latency, which is based on the transmission time of the message, $T_X$.

In some embodiments of the invention, in which the mobile communication network 200 is a motion control system such as the mobile control system 100 of FIG. 1, the first message 311 may comprise data about the initial position or rotation of the one or more actuators, or a machine or robot being controlled or a part thereof, or data from the one or more sensors. Accordingly, in said embodiments, the second entity 220 may then process the actuator or senor data to generate a set of instructions, or desired set points, in accordance with an automation program.

The second entity 220 will then send a first response message 321 to the first entity 210. Although not shown in FIG. 3, the first entity 210 has a receiving window within which it expects to receive the first response message 321 from the second entity 220. After receiving the first response message 321, at time $t_2$, in the first response message receiving window the first entity 210 will process the first response message 321 and act in accordance with the information contained within the first response message 321.

In embodiments of the invention in which the mobile communication network is a motion control system such as the mobile control system 100 of FIG. 1, the first response message 321 comprises the generated set of instructions, or desired set points. Accordingly, in said embodiments, the second entity 220 may then control the one or more actuators which it is controlling or in communication with, and may obtain data representing actual values of the position and/or rotation of the actuators or other appropriate sensor data.

In accordance with the periodic communication regime under which the first entity 210 and second entity 220 are operating, the first entity 210 will send a second message of a periodic transmission 312 to the second entity 220 after a desired transmission interval, $T_i$. This second message of a periodic transmission may comprise the obtained data representing actual values of the position and/or rotation of the actuators or other appropriate sensor data. The second message of a periodic transmission 312 is received by the second entity 220, at a time $t_3$, within the second message of a periodic transmission receiving window 360.

Similarly, to the first message of a periodic transmission 311, the second entity 220 will process the second message 312 and act in accordance with the information contained within the second message 312 and subsequently transmit a second response message 322 back to the first entity 210.

If there is no interruption to the mobile network over which the first entity 210 and second entity 220 are periodically transmitting messages, the first entity 210 and the second entity 220 should continue to periodically transmit respective messages of a periodic transmission 311, 312, 313 and response messages 321, 322, 323 to one another, as shown in FIG. 3. The periodicity of the periodic transmissions may be altered in accordance with an automation program.

In some embodiments, the first entity 210 transmits the messages of a periodic transmission 311, 312, 313, to the second entity 220 using a plurality of lower layer messages, for example using one or more PDUs. Similarly, the second entity 220 may transmit the response messages 321, 322 and 323 using a plurality of lower layer messages, for example using one or more PDUs.

Figure 3A:
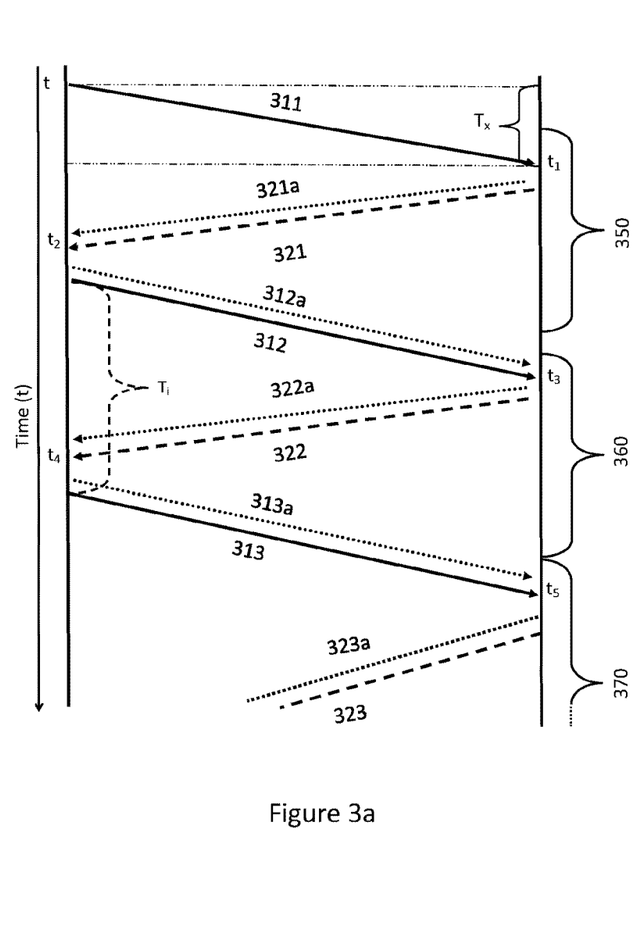
FIG. 3a shows an example of a periodic exchange of data between a first entity and a second entity.

FIG. 3a shows an example of periodic data exchange between a first entity 210 and a second entity 220 similarly to FIG. 3 but in which an ACK/NACK mode, such as the one specified in 3GPP TS 36.213, Version 15.7.0, 28 Sep. 2019, has been implement. In this example, the first entity 210 and second entity 220, send ACK messages along with the periodic transmissions to inform the second entity 220 and first entity 210 respectively, that the respective response messages and messages of a periodic transmission have been received. This is done only in order to ensure that the required Quality of Service (QoS) is met.

Figure 4:
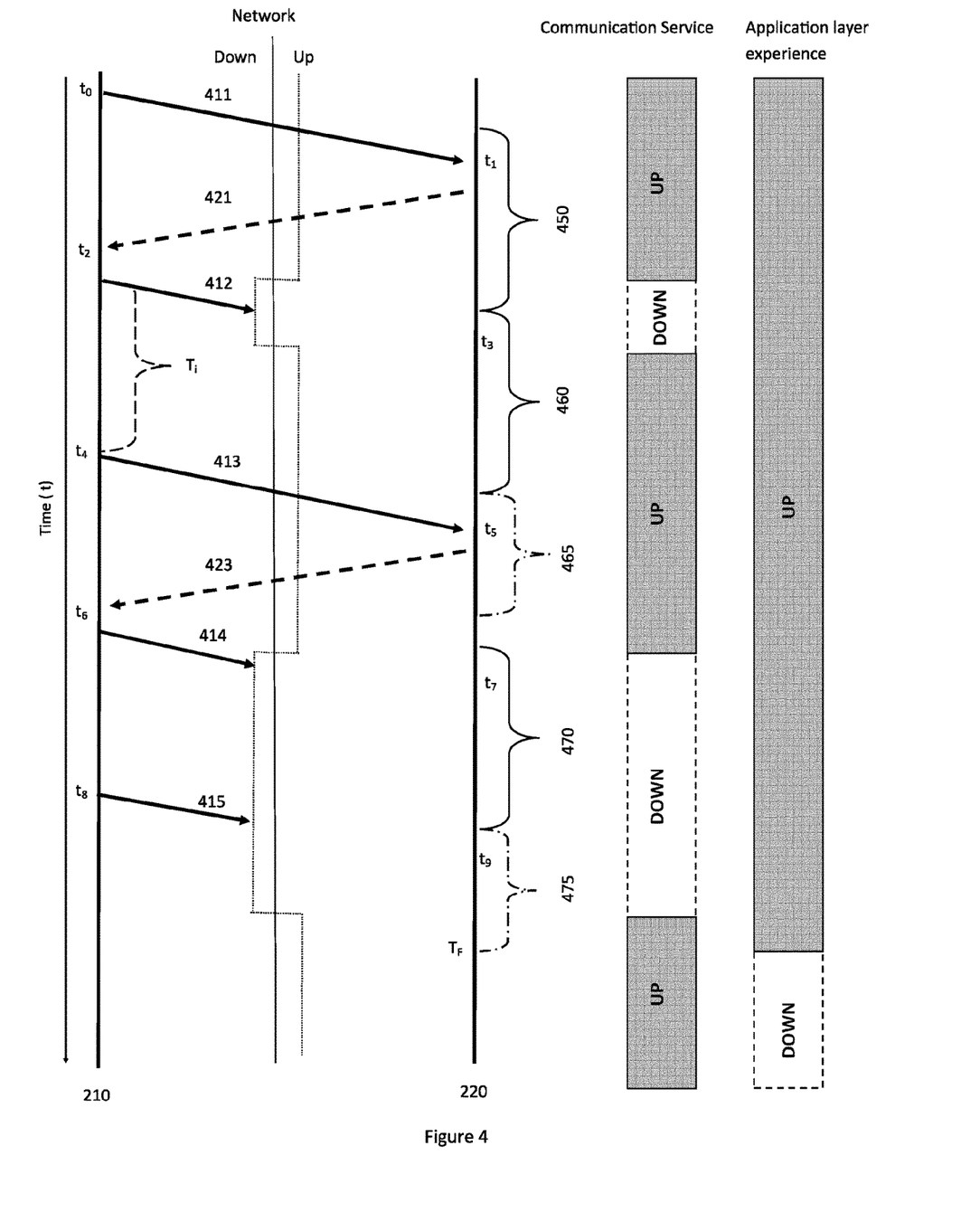
FIG. 4 shows an example of a periodic exchange of data between a first entity and a second entity during which an interruption to the network is experienced.

FIG. 4 shows an example of periodic exchange of data between a first entity 210 and a second entity 220 in which the mobile network over which the first entity 210 and the second entity 220 are communicating is interrupted, unavailable or experiences down time. The availability of the mobile network, also known as the network status, is represented in FIG. 4 by the dashed line between the first entity 210 and the second entity 220. When the dashed line is on the right hand side of the solid line the mobile network can be considered to be "Up" and operating normally, however, when the dashed line is shown on the left hand side of the solid line the mobile network can be considered to be "Down". When the network is "Down", messages may not be able to be successfully transmitted from the first entity 210 to the second entity 220.

The communication service, which can be considered to be the ability for the first entity to communicate with the second entity 220, will experience "UP" time and "DOWN" time in correspondence with the network "Up" time and "Down" time.

The application layer experience represents the experience of the application layer of the second entity 220. If the application layer is in "UP" time then it can be considered to be functioning normally and an application will continue running. If the application layer is "DOWN" then the application has failed and must be restarted before it can resume.

At time to the network is up and the first entity 210 transmits a first message of a periodic transmission 411 to the second entity 220. At time $t_1$, the second entity 220 successfully receives the first message of a periodic transmission 411 and subsequently transmits a first response message 421 to the first entity 210, which is successfully received at time $t_2$. After the transmission interval, $T_i$, the first entity 210 transmits a second message of a periodic transmission 412 to the second entity 220. However, the network is down when the first entity 210 attempts to transmit the second message of a periodic transmission 412 to the second entity 220 such that the second entity 220 fails to receive the second message of a periodic transmission 412 within the second receiving window 460. As a result, at second entity 220 the application layer will enter into survival time 465, which allows the application to continue running. In this example, the first entity 210 may not be aware that the second entity 220 has not received the second message of a periodic transmission 412 and will transmit a third message of a periodic transmission 413 to the second entity 220.

Alternatively, the first entity 210 may enter into survival time after failing to receive a second response message 422 but may be enabled to send the third message of a periodic transmission 413.

At time $t_5$, the second entity 220 successfully receives the third message of a periodic transmission 413 within the second entity survival time 465. This is because the network is now back in up time. After, the second entity 220 has successfully received the third message of a periodic transmission 413 within the second entity survival time 465, it will exit from the survival time 465. As can be seen from FIG. 4, because the second entity 220 was able to successfully receive the third message of a periodic transmission 413 within the survival time 465, the application layer continues to experience up time.

The second network 220 may then transmit a third response message 423, which is successfully received by the first entity 210 at time $t_6$.

After the transmission interval, $T_i$, the first entity transmits a fourth message of a periodic transmission 414 to the second entity 220. However, the network is down when the first entity 210 attempts to transmit the fourth message of a periodic transmission 414 to the second entity 220 such that the second entity 220 fails to receive the fourth message of a periodic transmission 414 at the expected time $t_7$ or within the receiving window 470. As a result, at second entity 220 the application will enter into survival time 475, which allows it to continue running. After the transmission interval, $T_i$, the first entity transmits a fifth message of a periodic transmission 415 to the second entity 220. However, the network is still down, such that the second entity 220 also fails to receive the fifth message of a periodic transmission 415 at time $t_9$ or within the survival time 475.

After expiry of the survival time 475, at time $T_F$, the application layer will experience down time such that the application will fail. Once the application has failed it will need to be restarted before it can continue. In embodiments of the invention in which the mobile communication network is a motion control system such as the mobile control system 100 of FIG. 1, failure of the application may cause the one or more actuators being controlled to cease or halt any operations or actions they are carrying out. This will, in turn, cause the automated factory or assembly line to unexpectedly and/or unwantedly stop production, which may lead to a decrease in factory output, an increase in wasted time and energy of production and an increase in the overall production costs.

Currently, such interruptions and failures make the use of mobile networks for motion control systems or systems for factory automation problematic. Even when an ACK/NACK mode, such as the one specified 3GPP TS 36.213, Version 15.7.0, 28 Sep. 2019, has been implement, and the communication service availability is in accordance with the Quality of Service (QoS) shown in Table 1. In particular, currently, if operating in an ACK/NACK mode, such as that shown in FIG. 3a, the first entity 210 and the second entity 220 would transmit ACK/NACK messages when the messages of a periodic transmission and/or the response messages were, or were not, successfully received respectively. However, this would not prevent the application from failure because, currently, when the first entity 210 and/or second entity 220 receives a NACK message, it does not alter its behaviour. Instead, the ACK/NACK messages are only utilised to ensure that the communication service availability is in accordance with the Quality of Service (QoS).

In embodiments of the present invention, before the periodic exchange of data between the first entity 210 and the second entity 220 is initiated, the first entity 220 will obtain information comprising a required receiving window time and a second entity survival time from the second entity 220. This information may be obtained during establishment of communication between the first entity 210 and the second entity 220, or it may be provided to the first entity 210 before the communication is established. Additionally, in some embodiments, together with the receiving window time and survival time, the size of the message of a periodic transmission is obtained. The knowledge of the size of the message of a periodic transmission is important as the transmission time may differ, depending on the size of the message, and may provide important information for determining application behaviour.

Alternatively, in some embodiments, the second entity 220 may initiate periodic transmissions with the first entity 210 and/or before the periodic exchange of data between the second entity 220 and the first entity 210 is initiated, the second entity 220 will obtain information comprising a required receiving window time for the first entity 210 and a first entity survival time from the first entity 210. This information may be obtained during establishment of communication between the first entity 210 and the second entity 220, or it may be provided to the second entity 220 before the communication is established. Additionally, in some embodiments, together with the receiving window time and a first entity survival time, the size of the message of a periodic transmission is obtained. The knowledge of the size of the message of a periodic transmission is important as the transmission time may differ, depending on the size of the message, and may provide important information for determining application behaviour.

In embodiments of the present invention, the first entity 210 and the second entity 220 know the times at which the messages of a periodic transmission are to be sent and/or received and when the corresponding response messages are to be sent and/or received. Therefore, the first entity 210 and/or the second entity 220 are enabled to only send NACK messages when an expected message of a periodic transmission or response messages have not been successfully received. This mode of operation requires the second entity 220 to know if the first entity 210 supports negative acknowledgments only (NACK). The second entity 220 may obtain the knowledge about the support of "negative acknowledgements only" of the first entity 210 during a capability exchange procedure in the communication establishment phase before the periodic exchange of data has been initiated. One advantage of the use of a NACK only mode of operation is that speed of transmission of data is increased, as there is no longer a need to send positive acknowledgements (ACK messages).

Figure 5:
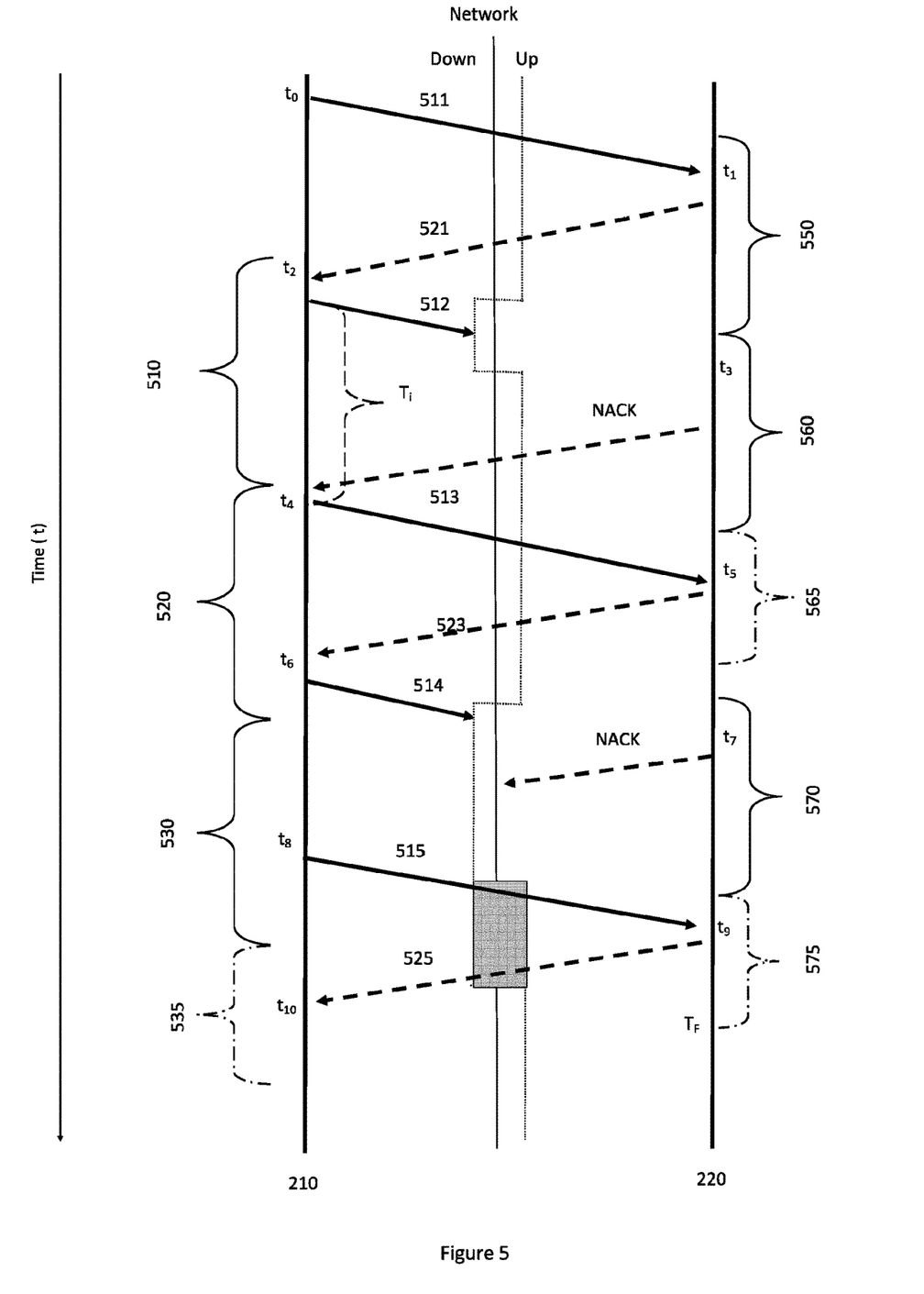
FIG. 5 shows a periodic exchange of data between a first entity and a second entity during which an interruption to the network is experienced according to the present invention.

FIG. 5 shows a method of periodic exchange of data between a first entity 210 and a second entity 220 according to an embodiment of the present invention.

At time $t_0$ the network is up and the first entity 210 transmits a first message of a periodic transmission 511 to the second entity 220. At time $t_1$, the second entity 220 successfully receives the first message of a periodic transmission 511 and subsequently transmits a first response message 521 to the first entity, which is successfully received at time $t_2$. After the transmission interval, $T_i$, the first entity 210 transmits a second message of a periodic transmission 512 to the second entity 220. However, the network is down when the first entity 210 attempts to transmit the second message of a periodic transmission 512 to the second entity 220 such that the second entity 220 fails to receive the second message of a periodic transmission 512 at the expected time $t_3$ or within the second receiving window 560.

In some embodiments, the second message of a periodic transmission 512 may be received by the second entity 220 but the second entity 220 may be unable to correctly decode or process at least part of the second message of a periodic transmission 512. The second entity 220, will consider this to be an invalid message of a periodic transmission and may consider those parts of the message of a periodic transmission which were unable to be correctly decoded or processed as if they had not been received.

In the embodiment shown in FIG. 5, the second entity 220 transmits, to the first entity 210, an adverse response to the first message of a periodic transmission which comprises a NACK. The first NACK transmitted from the second entity 220 to the first entity 210 is one type of adverse response that can be provided by the second entity 220 to the first entity 210.

The adverse response, which in this embodiment comprises a NACK, transmitted from the second entity 220 may be transmitted with the same periodicity as second entity 220 would transmit the first response message. In particular, the adverse response comprising the NACK may be transmitted after the transmission interval, $T_i$, with which the messages of a periodic transmission and corresponding response messages are transmitted. If the second entity 220 has a different transmission interval to the first entity 210, then the adverse response comprising a NACK may be transmitted in accordance with the second entity transmission interval. Alternatively, the second work entity 220 may transmit adverse response comprising a NACK to the first entity 210 at a time independent of the second entity transmission interval. For example, the second entity 220 may transmit an adverse response comprising a NACK to the first entity 210 after determining that a part or all of a message of a periodic transmission has not been received or is not able to be correctly decoded or processed by the second entity 220.

After receiving the adverse response from the second entity at time $t_4$, which in this embodiment comprises a NACK, the first entity 210 transmits an ancillary message to the second entity 220. The ancillary message may comprise a retransmission of the first message of periodic transmission.

In some embodiments, the messages of a periodic transmission are transmitted to the second entity 220 using a plurality of lower layer messages, for example using one or more PDUs. If a NACK is transmitted from the second entity 220 to the first entity 210, the NACK may contain information identifying which of the one or more PDUs were not successfully received. The ancillary message transmitted may then comprise a retransmission of only the PDUs that were identified as not being successfully received by the second entity 220.

Alternatively, the ancillary message may comprise a transmission of the second message of period communication if the first entity 210 determines that the second entity 220 does not require the first message of a periodic transmission to be retransmitted. This determination may be based on any combination of the receiving time of the second entity, the survival time of the second entity and the particular application running at the second entity.

Generally, the content of the ancillary message is determined based on the adverse response, the required receiving window time and the second entity survival time.

In the embodiment shown in FIG. 5, the first entity 210 and the second entity 220 successfully transmit one further message of a periodic transmission 513 and corresponding response message 523. The message of a periodic transmission 514 is unable to be successfully transmitted to the second entity 220 as the network is down. In this embodiment, the second entity 220 transmits a second NACK to the first entity 210. The second entity 220 will also enter survival time after the expiry of its receiving window. The NACK is not received by the first entity 210 because the network is down. The first entity 210 does not receive any response message from the second entity 220 at the expected time $t_8$ or within the receiving window. The failure of the first entity 210 to receive a response from the second entity 220 is also considered to be an adverse response, where the adverse response comprises receiving no response from the second entity 220.

As shown in FIG. 5, if the second entity not receiving the subsequent message of a periodic transmission 515 would cause the second entity to fail, due to the message of period transmission 515 not being received with the survival time of the second entity 575, and before time $T_F$, then the first entity modulation and/or coding scheme may be adapted. Alternatively, or in addition to the first entity modulation and/or coding scheme being adapted, more resources may be allocated to the delivery of the message of a periodic transmission 515 to increase the likelihood that it is successfully transmitted to the second entity 220. The allocation of more resources may comprise providing the first entity 210 with more bandwidth for transmission, assigning the transmissions from the first entity 210 a higher priority on the mobile communication network, or increasing any other resources required by the first entity 210 to transmit a message of a periodic transmission.

In the embodiment shown in FIG. 5, the adaptation of the first entity modulation/coding scheme and/or the allocation of more resources to the transmissions of the message of a periodic transmission 515 results in the message of a periodic transmission 515 being received within the survival time 575 of the second entity 220, such that the application does not fail.

Figure 6:
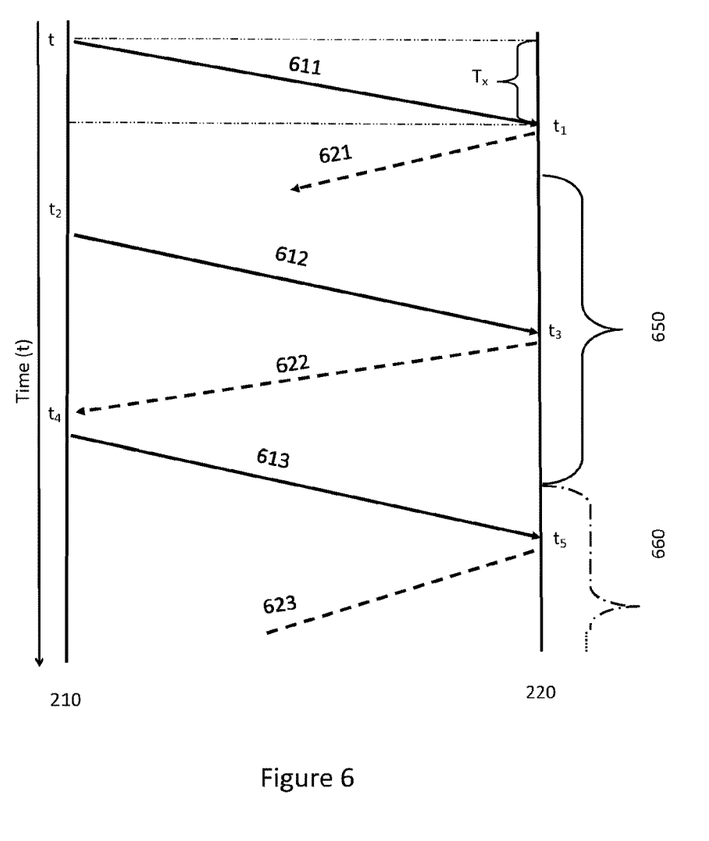
FIG. 6 shows another periodic exchange of data between a first entity and a second entity during which an interruption to the network is experienced according to the present invention.

FIG. 6 shows another method of periodic exchange of data between a first entity 210 and a second entity 220 according to an embodiment of the present invention.

At time $t_0$ the first entity 210 successfully transmits a first message of a periodic transmission 611 to the second entity 220. At time $t_1$, the second entity 220 successfully receives the first message of a periodic transmission 611 and subsequently attempts to transmits a first response message 621 to the first entity 210. Due to a network interruption, all or part of the first response message 621 is not successfully received by the first entity 210. After the first entity 210 does not receive the first response message 621, the first entity will consider an adverse response to have been obtained. In some embodiments, the first response message 621 may be received by the first entity 210 but the first entity may be unable to correctly decode or process at least part of the first response message 210. The first entity 210, will consider this to be an invalid response to the first message of a periodic transmission 611, where an invalid response is another type of adverse response.

After receiving the adverse response from the second entity 220, the first entity 210 transmits an ancillary message 612 to the second entity 220. In this embodiment, the ancillary message comprises a NACK. The ancillary message 612 may also comprise a retransmission of the first message of a periodic transmission 611 or a transmission of new data, for example, feedback to the parts of the first response message 621 that were successfully received, decoded or processed by the first entity 210.

In some embodiments, the messages of a periodic transmission, and the response messages, are transmitted using a plurality of lower layer messages, for example using one or more PDUs. If a NACK is transmitted from the first entity 210 to the second entity 220, the NACK may contain information identifying which of the one or more PDUs were not successfully received, decoded or processed by the first entity 210.

The ancillary message, which in this embodiment comprises a NACK, transmitted from the first entity 210 may be transmitted with the same periodicity as first entity 210 would transmit a second message of a periodic transmission. In particular, the ancillary response comprising a NACK may be transmitted after the transmission interval, Ti, with which the messages of a periodic transmission are transmitted. Alternatively, the first entity 210 may transmit an ancillary message to the second entity 220 at a time independent of the transmission interval, $T_i$. For example, the first entity 210 may provide an ancillary message to the second entity 220 after determining that a part or all of a response message has not been received or is not able to be correctly decoded or processed by the first entity 210.

After the negative acknowledgement message (NACK) is received by the second entity 220, the second entity may re-transmit all or some part of the data associated with the first response message 621 based on the received ancillary message 612. For example, the second entity 220 may retransmit the one or more PDUs were not successfully received, decoded or processed identified in the ancillary message. The second entity may also transmit new data, such as feedback to the new data contained in the ancillary message 612.

This re-transmission message 622 may be transmitted with the same periodicity as second entity 220 would transmit a second response message if an ancillary message 612 had not been received from the first entity 210. In particular, the re-transmission 622 may be transmitted after the transmission interval, Ti, with which the messages of a periodic transmission and corresponding response messages are transmitted. If the second entity 220 has a different transmission interval to the first entity 210, then the message 622 may be transmitted in accordance with the second entity transmission interval. Alternatively, the second work entity 220 may transmit the re-transmission message 622 to the first entity 210 at a time independent of the second entity transmission interval. For example, the second entity 220 may transmit the re-transmission message to the first entity 210 after receiving the ancillary message 612 and determining that a part or all of a message of a periodic transmission has not been received or is not able to be correctly decoded or processed by the first entity 210.

Additionally, after receiving the ancillary message 612 from the first entity 210, the second entity may decide to adapt the modulation/coding scheme of the first entity 210 and/or the second entity 220 may be based on any combination of the receiving window of the second entity 650, the survival time 660, the transmission time of the messages from the first entity ($T_x$), the number of NACKs sent or received, and the application being run. The second entity 220 may also determine how the modulation/coding scheme of the first entity 210 and/or the second entity 220 is to be adapted. In the embodiment shown in FIG. 6, the second entity may determine that the number of retransmissions NACKs it can receive from the first entity is two before the expiry of the survival time 660. Therefore, after receiving a NACK in the ancillary message 612 the second entity decides that the modulation/coding scheme of the first entity 210 or the second entity 220 should be adapted. Generally, the second entity 220 will decide to adapt the modulation scheme at n−1 NACKs, where n is the number of NACKs the second entity can send or receive before the expiry of the survival time and failure of the application.

Adapting the modulation/coding scheme of the first entity 210 and/or the second entity 220 increases the probability of successful transmissions to and from the second entity 220. In particular, the probability of receiving the first network node 210 receiving the second response massage 622 will be increased, as will the probability of the first network node 210 successfully transmitting the subsequent message of a periodic transmission 613 and the second entity to successfully receive it. The second entity 220 may also decide to increase the amount of resources allocated to the delivery of messages transmitted by the first network node 210.

The second entity 220 may also modify the resources allocated to the first entity 210 and/or second entity 220 in order to increase the likelihood of the successful periodic transmissions between the first entity 210 and the second entity 220.

Figure 7:
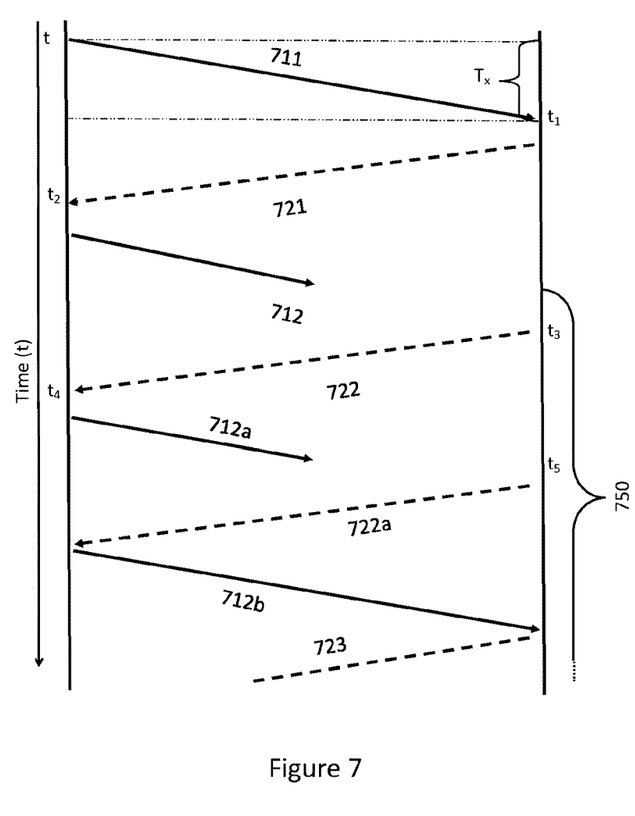
FIG. 7 shows a further periodic exchange of data between a first entity and a second entity during which an interruption to the network is experienced according to the present invention.

FIG. 7 shows another method of periodic exchange of data between a first entity 210 and a second entity 220 according to an embodiment of the present invention.

At time $t_0$ the first entity 210 successfully transmits a first message of a periodic transmission 711 to the second entity 220. At time $t_1$, the second entity 220 receives the first message of a periodic transmission 611 and subsequently transmits a first response message 621 to the first entity 210. The first response message 721 is successfully received by the first entity 210 at time $t_2$.

The first entity 210 then attempts to send a second message of a periodic transmission 712 to the second entity 220. Due to a network interruption, all or part of the second message of a periodic transmission 712 is not successfully received by the second entity 220. In some embodiments, the second message of a periodic transmission 712 may be received by the second entity 220 but the second entity 220 may be unable to correctly decode or process at least part of the second message of a periodic transmission 712. The second entity 220, will consider this to be an invalid message of a periodic transmission and may consider those parts of the message of a periodic transmission which were unable to be correctly decoded or processed as if they had not been received.

The second entity 220 then transmits an adverse response 722 to the first entity 210. The adverse response 722 will comprise a NACK. The adverse response 722 may also comprise a retransmission of the first response message 721 or a transmission of new data, for example, feedback to the parts of the second message of a periodic transmission 712 that were successfully received, decoded or processed by the second entity 220.

In some embodiments, the messages of a periodic transmission, and the response messages, are transmitted using a plurality of lower layer messages, for example using one or more PDUs. If an adverse response comprising a NACK is transmitted from the second entity 220 to the first entity 220, the NACK may contain information identifying which of the one or more PDUs were not successfully received, decoded or processed by the second entity 220.

The adverse response, which in this embodiment comprises a NACK, transmitted from the second entity 220 may be transmitted with the same periodicity as second entity 220 would transmit the first response message. In particular, the adverse response comprising a NACK may be transmitted after the transmission interval, Ti, with which the messages of a periodic transmission and corresponding response messages are transmitted. If the second entity 220 has a different transmission interval to the first entity 210, then the adverse response comprising a NACK may be transmitted in accordance with the second entity transmission interval. Alternatively, the second work entity 220 may transmit an adverse response comprising a NACK to the first entity 210 at a time independent of the second entity transmission interval. For example, the second entity 220 may transmit an adverse response comprising a NACK to the first entity 210 after determining that a part or all of a message of a periodic transmission has not been received or is not able to be correctly decoded or processed by the second entity 220.

The second entity may also decide to adapt the modulation/coding scheme of the first entity 210 and/or the second entity 220 when transmitting the adverse response message 722, the determination may be based on any combination of the receiving window of the second entity 750, the survival time, the transmission time of the messages from the first entity (Tx), the number of NACKs sent or received, and the application being run. The second entity 220 may also determine how the modulation/coding scheme of the first entity 210 and/or the second entity 220 is to be adapted. In the embodiment shown in FIG. 7, the second entity may determine that the number of NACKs it send to the first entity is four before the expiry of the survival time, as the receiving window and survival time in the embodiment of FIG. 7 are significantly greater than the transmission time $T_x$. Therefore, the second entity decides that the modulation/coding scheme of the first entity 210 or the second entity 220 does not yet need to be adapted. Generally, the second entity 220 will decide to adapt the modulation/coding scheme at n−1 NACKs, where n is the number of NACKs the second entity can send or receive before the expiry of the survival time and failure of the application.

Additionally, the second entity 220 may also modify the resources allocated to the first entity 210 and/or second entity 220 in order to increase the likelihood of the successful periodic transmissions between the first entity 210 and the second entity 220.

After receiving the adverse response from the second entity at time $t_4$, which in this embodiment comprises a NACK, the first entity 210 transmits an ancillary message 712a to the second entity 220. The ancillary message 712a may comprise a retransmission of all of the information contained in the message of a periodic transmission specified in the adverse response 722. Optionally, the ancillary message 712a transmitted may comprise a re-transmission of only the PDUs which were identified as not being successfully received by the second entity 220.

Alternatively, the ancillary message may comprise a transmission of a new message of period communication if the first entity 210 determines that the second entity 220 does not require the previous message of a periodic transmission 712 to be retransmitted. This determination may be based on any combination of the receiving time of the second entity 750, the survival time of the second entity and the particular application running at the second entity.

The ancillary message, which in this embodiment comprises at least a partial re-transmission of the second message of periodic transmission 712, may be transmitted with the same periodicity as first entity 210 would transmit a message of a periodic transmission. In particular, the ancillary response comprising may be transmitted after the transmission interval, Ti, with which the messages of a periodic transmission are transmitted. Alternatively, the first entity 210 may transmit an ancillary message to the second entity 220 at a time independent of the transmission interval, $T_i$. For example, the first entity 210 may transmit the ancillary message 712a to the second entity 220 after receiving the adverse response message 722 and determining that a part or all of a message of a periodic transmission has not been received or is not able to be correctly decoded or processed by the second entity 220. After the ancillary message 712a is not successfully received by second entity 220 then transmits another adverse response 722a to the first entity 210. The another adverse response 722a will also comprise a NACK. The adverse response 722a may also comprise a retransmission of the first response message 721 or a transmission of new data, for example, feedback to the parts of the ancillary message 712a which were successfully received, decoded or processed by the second entity 220.

In some embodiments, the messages of a periodic transmission, and the response messages, are transmitted using a plurality of lower layer messages, for example using one or more PDUs. If a NACK is transmitted from the second entity 220 to the first entity 220, the NACK may contain information identifying which of the one or more PDUs were not successfully received, decoded or processed by the second entity 220.

Again, the second entity 220, may determine whether to adapt the modulation/coding scheme of the first entity 210 and/or the second entity 220. Again, this determination may be based on any combination of the receiving window of the second entity 750, the survival time, the transmission time of the messages from the first entity (Tx), the number of NACKs sent or received, and the application being run. The second entity may determine that the number of NACKs it send to the first entity is four before the expiry of the survival time, as the receiving window and survival time in the embodiment of FIG. 7 are significantly greater than the transmission time Tx. Therefore, the second entity decides that the modulation/coding scheme of the first entity 210 or the second entity 220 does not yet need to be adapted as adverse response 722a is the second NACK that the second entity 220 has sent. Generally, the second entity 220 will decide to adapt the modulation/coding scheme at n−1 NACKs, where n is the number of NACKs the second entity can send or receive before the expiry of the survival time and failure of the application.

The second entity 220 may also modify the resources allocated to the first entity 210 and/or second entity 220 in order to increase the likelihood of the successful periodic transmissions between the first entity 210 and the second entity 220.

In the embodiment shown in FIG. 7, the first entity 210 transmits another ancillary message 712b to the second entity 220. The ancillary message 712b may comprise a retransmission of all of the information contained in the message of a periodic transmission or ancillary message 712a specified in the adverse response 722a. Optionally, the another ancillary message 712b transmitted may comprise a re-transmission of only the PDUs which were identified as not being successfully received by the second entity 220.

Alternatively, the another ancillary message 712b may comprise a transmission of a new message of period communication if the first entity 210 determines that the second entity 220 does not require the previous message of a periodic transmission 712 to be retransmitted. This determination may be based on any combination of the receiving time of the second entity 750, the survival time of the second entity and the particular application running at the second entity.

As shown in FIG. 7, the another ancillary message 712b is successfully received by the second entity 220 and periodic exchange of data between a first entity 210 and a second entity 220.

Figure 8:
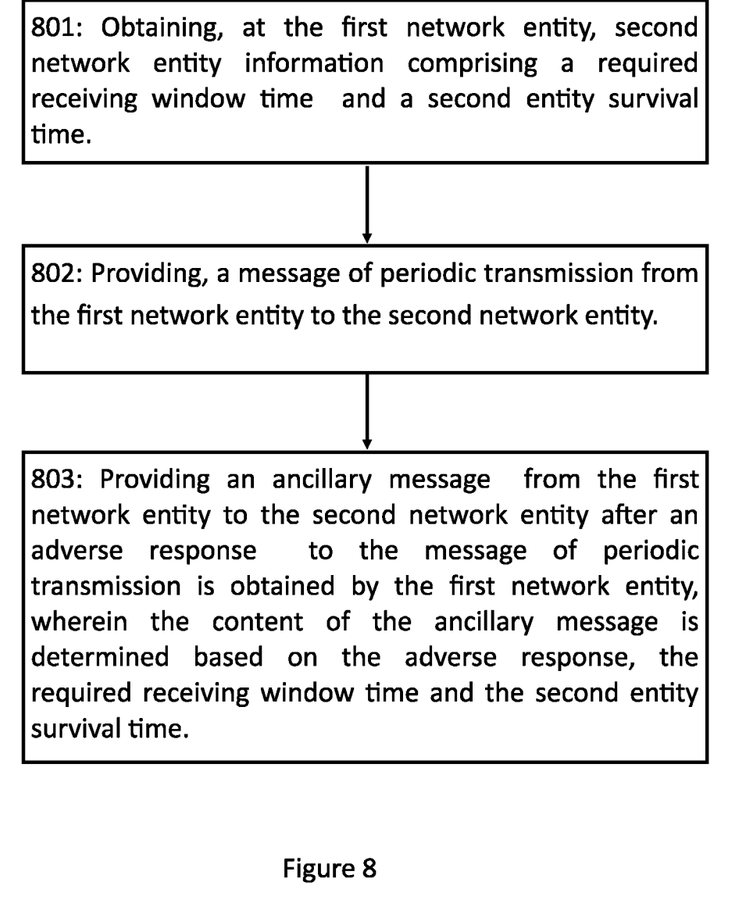
FIG. 8 is a flow diagram of a generalised method of periodically exchanging data between a first entity and a second entity according to the present invention.

FIG. 8 shows a flow diagram depicting a generalised method of periodic transmission between a first entity 210 and a second entity 220 according to the present invention.

At step 801, the method comprises obtaining, at the first entity, second entity information comprising a required receiving window time and a second entity survival time. The required receiving window time may correspond to the current receiving window of the second entity 220.

At step 802, the method comprises providing, a message of a periodic transmission from the first entity 210 to the second entity 220.

At step 803, the method comprises providing an ancillary message from the first entity to the second entity after an adverse response to the message of a periodic transmission is obtained by the first entity, wherein the content of the ancillary message is determined based on the adverse response, the required receiving window time and the second entity survival time.

In any of the previous embodiments of the invention described herein, the required receiving window time and the survival time of the first entity, or the second entity can be changed or modified using RRC and/or MAC protocol at any time during data exchange. The transmission time ($T_x$) may also change depending on the periodic message size, the current modulation/coding scheme being used and the resources available for the transmission of data between the first entity 210 and the second entity 220. For example, if a greater number of resources are allocated to the sending of a message of a periodic transmission the transmission time ($T_x$) will be reduced. Whilst the transmission time has been shown as being the same for the messages of period transmission between the first entity and second entity, the transmission time might be different for the first and second entity. For example, differences may arise due to the modulation/coding scheme being used, the message size or other characteristics that might differ for the particular direction of data transmission.

Additionally, when the number of NACKs received by the second entity 220 is n–1 the system may go to critical mode to guarantee the receipt of the desired message of period communication or response message. When in critical mode, the first entity 210 and/or the second entity 220 will operate on the minimum MCS (modulation and coding scheme).

In some embodiments of the present invention, the first entity 210, may determine whether to adapt the modulation/coding scheme of the first entity 210 and/or the second entity 220. This determination may be based on any combination of the receiving window of the second entity 220 or the first entity 210, the survival time of the first entity 210 or the second entity 220, the transmission time of the messages from the first entity (Tx), the number of NACKs sent or received by the first entity 210, and the application being run. The first entity 210 may also determine how the modulation/coding scheme of the first entity 210 and/or the second entity 220 is to be adapted. In this alternative embodiment, the first entity 220 may decide to adapt the modulation/scheme at n–1 NACKs, where n is the number of NACKs the first entity 210 can send or receive before the expiry of the survival time and failure of the application.

It will be appreciated that embodiments of the present invention may be implemented using a variety of different information processing systems. In particular, although the figures and the discussion thereof provide an exemplary system and methods, these are presented merely to provide a useful reference in discussing various aspects of the invention. Embodiments of the invention may be carried out on any suitable data processing device, such as a personal computer, laptop, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Figure 9:
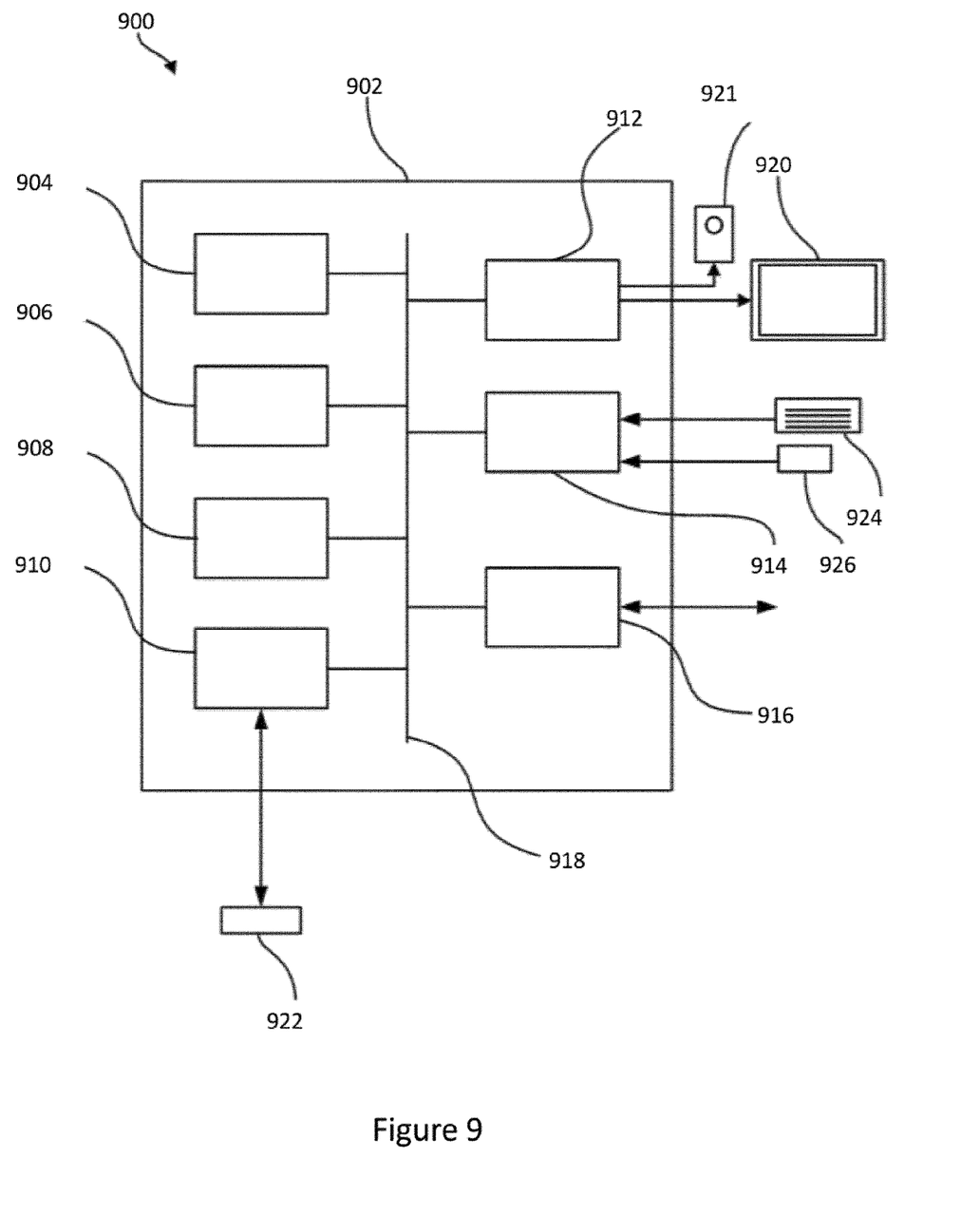
FIG. 9 schematically illustrates an example of a computer system.

FIG. 9 schematically illustrates an example of a computer system 900. The system 900 comprises a computer 902. The computer 902 comprises: a storage medium 904, a memory 106, a processor 908, an interface 910, a user output interface 912, a user input interface 914 and a network interface 916, which are all linked together over one or more communication buses 918.

The storage medium 904 may be any form of non-volatile data storage device such as one or more of a hard disk drive, a magnetic disc, an optical disc, a ROM, etc. The storage medium 904 may store an operating system for the processor 908 to execute in order for the computer 902 to function. The storage medium 904 may also store one or more computer programs (or software or instructions or code).

The memory 906 may be any random access memory (storage unit or volatile storage medium) suitable for storing data and/or computer programs (or software or instructions or code).

The processor 908 may be any data processing unit suitable for executing one or more computer programs (such as those stored on the storage medium 904 and/or in the memory 906), some of which may be computer programs according to embodiments of the invention or computer programs that, when executed by the processor 908, cause the processor 908 to carry out a method according to an embodiment of the invention and configure the system 900 to be a system according to an embodiment of the invention. The processor 908 may comprise a single data processing unit or multiple data processing units operating in parallel or in cooperation with each other. The processor 908, in carrying out data processing operations for embodiments of the invention, may store data to and/or read data from the storage medium 904 and/or the memory 906.

The interface 910 may be any unit for providing an interface to a device 922 external to, or removable from, the computer 902. The device 922 may be a data storage device, for example, one or more of an optical disc, a magnetic disc, a solid-state-storage device, etc. The device 922 may have processing capabilities—for example, the device may be a smart card. The interface 910 may therefore access data from, or provide data to, or interface with, the device 922 in accordance with one or more commands that it receives from the processor 908.

The user input interface 914 is arranged to receive input from a user, or operator, of the system 900. The user may provide this input via one or more input devices of the system 900, such as a mouse (or other pointing device) 926 and/or a keyboard 924, that are connected to, or in communication with, the user input interface 914. However, it will be appreciated that the user may provide input to the computer 902 via one or more additional or alternative input devices (such as a touch screen). The computer 902 may store the input received from the input devices via the user input interface 914 in the memory 906 for the processor 908 to subsequently access and process, or may pass it straight to the processor 108, so that the processor 908 can respond to the user input accordingly.

The user output interface 912 is arranged to provide a graphical/visual and/or audio output to a user, or operator, of the system 900. As such, the processor 108 may be arranged to instruct the user output interface 912 to form an image/video signal representing a desired graphical output, and to provide this signal to a monitor (or screen or display unit) 120 of the system 100 that is connected to the user output interface 912. Additionally or alternatively, the processor 108 may be arranged to instruct the user output interface 912 to form an audio signal representing a desired audio output, and to provide this signal to one or more speakers 921 of the system 900 that is connected to the user output interface 112.

Finally, the network interface 916 provides functionality for the computer 902 to download data from and/or upload data to one or more data communication networks.

It will be appreciated that the architecture of the system 900 illustrated in FIG. 9 and described above is merely exemplary and that other computer systems 900 with different architectures (for example with fewer components than shown in FIG. 9 or with additional and/or alternative components than shown in FIG. 9) may be used in embodiments of the invention. As examples, the computer system 900 could comprise one or more of: a personal computer; a server or cloud computer; a laptop; other mobile network devices or consumer electronics devices; etc.

The invention claimed is:

1. A method of periodic transmission of data between a first entity and a second entity within a mobile communication network, the method comprising:
    obtaining, at the first entity, second entity information comprising a required receiving window time and a second entity survival time, during which the second entity can continue to run without failing;
    providing, a message of a periodic transmission from the first entity to the second entity; and
    providing an ancillary message from the first entity to the second entity after an adverse response to the message of a periodic transmission is obtained by the first entity, wherein the content of the ancillary message is determined based on the adverse response, the required receiving window time and the second entity survival time.

2. The method according to claim 1, wherein the adverse response comprises no response message being received from the second entity within a predetermined time period.

3. The method of according to claim 1, wherein the adverse response comprises an invalid message being received from the second entity.

4. The method of according to claim 1, wherein the adverse response comprises a negative acknowledgement message being received from the second entity.

5. The method according to claim 2, wherein the ancillary message comprises a negative acknowledgement message.

6. The method according to claim 1, wherein the ancillary message comprises a retransmission of information contained in the message of a periodic transmission.

7. The method according to claim 1, further comprising providing a second message of a periodic transmission from the first entity to the second entity.

8. The method according to claim 1, wherein the second entity information further comprises message size information for messages sent between the first entity and the second entity.

9. The method according to claim 1, wherein required receiving window time, second entity survival time and/or message size information are provided using an RRC protocol and/or a MAC protocol or a combination thereof.

10. The method according to claim 1, wherein a first entity modulation/coding scheme is adapted, and/or a resource allocation modified based on providing the ancillary message within the second entity survival time.

11. The method according to claim 1, wherein the second entity is configured to adapt a second entity modulation/coding scheme, and/or a resource allocation based on the adverse response message.

12. The method according to claim 1, wherein the second entity obtains a capability to (i) receive an adverse response comprising a negative acknowledgement message and (ii) transmit a negative acknowledgement message.

13. An entity of a mobile communication network configured to carry out the method according to claim 1.

14. A mobile communication network configured to carry out the method according to claim 1.

15. A non-transitory machine-readable medium having executable instructions stored thereon which, when executed by a processor, cause the processor to carry out a method according to claim 1.

* * * * *